US009189702B2

(12) United States Patent
Wang et al.

(10) Patent No.: US 9,189,702 B2
(45) Date of Patent: Nov. 17, 2015

(54) IMAGING SYSTEM FOR DETERMINING MULTI-VIEW ALIGNMENT

(71) Applicant: Cognex Corporation, Natick, MA (US)

(72) Inventors: Xiaoguang Wang, Alpharetta, GA (US); Dave Li, West Roxbury, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 13/731,434

(22) Filed: Dec. 31, 2012

(65) Prior Publication Data

US 2014/0185942 A1 Jul. 3, 2014

(51) Int. Cl.

| | |
|---|---|
| ***G06K 9/32*** | (2006.01) |
| ***G06K 9/46*** | (2006.01) |
| ***G06T 7/00*** | (2006.01) |
| ***G06T 3/00*** | (2006.01) |

(52) U.S. Cl.

CPC ................ *G06K 9/4633* (2013.01); *G06K 9/46* (2013.01); *G06K 9/4604* (2013.01); *G06T 3/0068* (2013.01); *G06T 7/0024* (2013.01); *G06T 7/0028* (2013.01); *G06T 2207/20061* (2013.01); *G06T 2207/30108* (2013.01)

(58) Field of Classification Search

CPC ...... G06T 3/0068; G06T 7/0024; G06K 9/46; G06K 9/4604; G06K 9/4633

USPC .......................................... 382/294, 281, 154

See application file for complete search history.

(56) References Cited

U.S. PATENT DOCUMENTS

| | | | | |
|---|---|---|---|---|
| 5,027,419 | A | 6/1991 | Davis | |
| 5,179,419 | A | 1/1993 | Palmquist et al. | |
| 5,297,238 | A | 3/1994 | Wang et al. | |
| 5,329,469 | A | 7/1994 | Watanabe | |
| 5,471,312 | A | 11/1995 | Watanabe et al. | |
| 5,553,859 | A | 9/1996 | Kelly et al. | |
| 5,642,442 | A | 6/1997 | Morton et al. | |
| 5,742,699 | A | 4/1998 | Adkins et al. | |
| 5,825,483 | A * | 10/1998 | Michael et al. | 356/243.1 |
| 5,872,870 | A | 2/1999 | Michael | |
| 5,878,165 | A | 3/1999 | Ono | |
| 5,960,125 | A * | 9/1999 | Michael et al. | 382/294 |
| 5,978,521 | A * | 11/1999 | Wallack et al. | 382/294 |
| 6,137,893 | A * | 10/2000 | Michael et al. | 382/103 |
| 6,301,396 | B1 * | 10/2001 | Michael et al. | 382/294 |

OTHER PUBLICATIONS

Ballard, D., "Generalizing the Hough Transform to Detect Arbitrary Shapes," Pattern Recognition, vol. 13, No. 2, pp. 111-122 (1981).

Office Action issued in related German Application Serial No. 10 2013 021 178.6 dated Sep. 2, 2015.

Li, Ze-Nian: Stereo Correspondence Based on Line Matching in Hough Space Using Dynamic Programming. In: IEEE Transactions on Systems, Man, and Cybernetcis 24, Jan. 1994, 1, 144-152.

* cited by examiner

*Primary Examiner* — Utpal Shah

(74) *Attorney, Agent, or Firm* — Holland & Knight LLP

(57) ABSTRACT

A computer-implemented method which may be used with imaging systems is provided. The method may include receiving a first image from a first device configured to generate the first image based upon, at least in part, a first portion of an item. The method may further include receiving a second image from a second device configured to generate the second image based upon, at least in part, a second portion of the item. The method may also include extracting one or more features from the first image and the second image in a multi-view calibration space wherein the one or more features share a global coordinate system. The method may further include applying a global constraints embedded Hough transform to the one or more features present in the first image and the second image.

18 Claims, 5 Drawing Sheets

IMAGING SYSTEM FOR DETERMINING MULTI-VIEW ALIGNMENT

TECHNICAL FIELD

This technology relates to multi-view alignment applications and more specifically to a system for applying global constraints to multi-view alignment problems.

BACKGROUND

Some machine vision systems may include alignment software, which may simplify work piece alignment for various manufacturing processes. In a multi-view alignment application, each view may contribute to the alignment by using a sub-model, or a portion of the global model. The correctness of the alignment is highly dependent on the correct finding of each and every sub-model. However, the sub-model itself (e.g. its shape) may not be sufficiently distinctive to ensure a reliable finding from the individual view. For example, distractive objects having a similar look to the sub-model may be present in an individual view, giving a traditional vision tool a hard time to find the correct sub-model from the view.

Some existing methods are configured to address applications having multiple views. Some of these may find a sub-model (e.g. a straight line) from each image, without applying global constraints. Instead, these methods may select the sub-models solely based on local heuristics, such as edge contrast, edge locations relative to the image, etc. These methods can be prone to false sub-model findings when distracting features are present in the images.

Another way of applying global constraints is to "stitch" all images together. Stitching generally refers to a process that can be used to generate a larger image, which includes multiple views as sub-images. The stitched image may have large areas of invalid pixels in the regions that are not covered by any view. A single-view alignment tool can then be applied to the stitched image to work out the alignment. This is doable when the multiple views are close enough, but is troublesome when the views are placed extremely distantly from one another. Stitching of images from sparsely placed views can cause very big image sizes or unrealistic parameterization of the single-view alignment tool.

SUMMARY OF DISCLOSURE

In one implementation, a computer-implemented method which may be used with an imaging system is provided. The method may include receiving a first image from a first device configured to generate the first image based upon, at least in part, a first portion of an item. The method may further include receiving a second image from a second device configured to generate the second image based upon, at least in part, a second portion of the item. The method may also include extracting one or more features from the first image and the second image in a multi-view calibration space wherein the one or more features share a global coordinate system. The method may further include applying a global constraints embedded Hough transform to the one or more features present in the first image and the second image.

One or more of the following features can be included. In some embodiments, the imaging device can include a plurality of imaging devices. The method can also include applying one or more global constraints to the multi-view calibration space. In some embodiments, the one or more global constraints can include one or more spatial relationships of sub-models. In some embodiments, the one or more features can be used, at least in part, to generate a quantized score for use in applying the global constraints embedded Hough transform. In some embodiments, the one or more features can include at least one of length, contrast, and straightness of a particular line segment. In some embodiments, the one or more spatial relationships of sub-models can include distance, angle, collinearity, parallelism, and perpendicularity.

In another implementation, a computer program product residing on a computer readable storage medium is provided. The computer program product can have a plurality of instructions stored thereon, which when executed by a processor, cause the processor to perform operations. Operations can include receiving a first image from a first device configured to generate the first image based upon, at least in part, a first portion of an item. Operations may further include receiving a second image from a second device configured to generate the second image based upon, at least in part, a second portion of the item. Operations may also include extracting one or more features from the first image and the second image in a multi-view calibration space wherein the one or more features share a global coordinate system. Operations may further include applying a global constraints embedded Hough transform to the one or more features present in the first image and the second image.

One or more of the following features can be included. In some embodiments, the imaging device can include a plurality of imaging devices. Operations can also include applying one or more global constraints to the multi-view calibration space. In some embodiments, the one or more global constraints can include one or more spatial relationships of sub-models. In some embodiments, the one or more features can be used, at least in part, to generate a quantized score for use in applying the global constraints embedded Hough transform. In some embodiments, the one or more features can include at least one of length, contrast, and straightness of a particular line segment. In some embodiments, the one or more spatial relationships of sub-models can include distance, angle, collinearity, parallelism, and perpendicularity.

In another implementation, an imaging system having one or more processors is provided. The one or more processors can be configured to receive a first image from a first device configured to generate the first image based upon, at least in part, a first portion of an item, the one or more processors further configured to receive a second image from a second device configured to generate the second image based upon, at least in part, a second portion of the item, the one or more processors further configured to extract one or more features from the first image and the second image in a multi-view calibration space wherein the one or more features share a global coordinate system, the one or more processors further configured to apply a global constraints embedded Hough transform to the one or more features present in the first image and the second image.

One or more of the following features can be included. In some embodiments, the imaging device can include a plurality of imaging devices. The one or more processors can be configured to apply one or more global constraints to the multi-view calibration space. In some embodiments, the one or more global constraints can include one or more spatial relationships of sub-models. In some embodiments, the one or more features can be used, at least in part, to generate a quantized score for use in applying the global constraints embedded Hough transform. In some embodiments, the one or more features can include at least one of length, contrast, and straightness of a particular line segment. In some embodiments, the one or more spatial relationships of sub-models can include distance, angle, collinearity, parallelism, and perpendicularity.

In another implementation, a computer-implemented method which may be used with an imaging system is provided. The method may include receiving a first image from a first device configured to generate the first image based upon, at least in part, a first portion of an item. The method may further include receiving a second image from a second device configured to generate the second image based upon, at least in part, a second portion of the item. The method may also include extracting one or more features from the first image and the second image in a multi-view calibration space wherein the one or more features share a global coordinate system. The method may further include applying a global constraints embedded transform to the one or more features present in the first image and the second image.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings can indicate like elements.

DETAILED DESCRIPTION OF THE EMBODIMENTS

Figure 1:
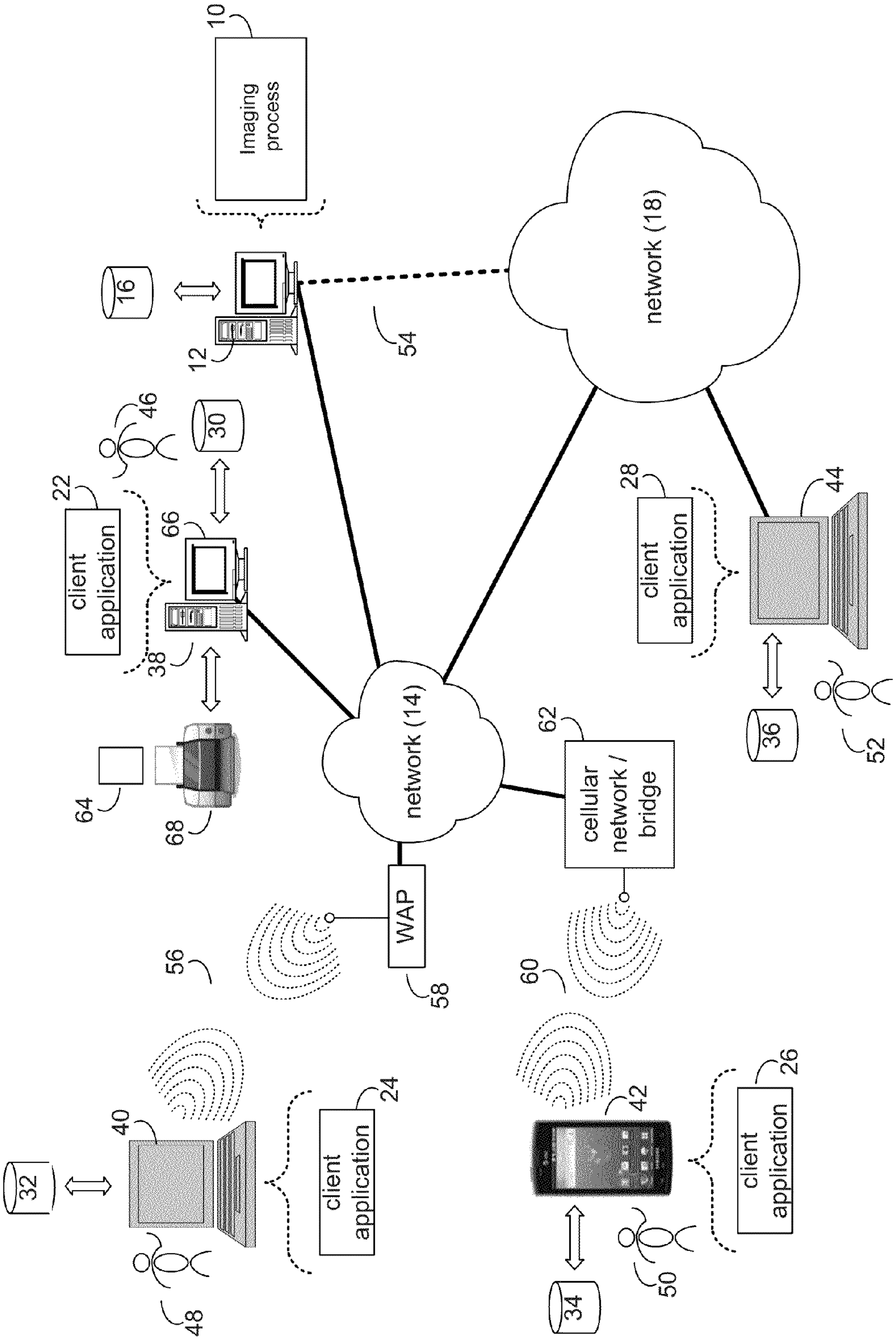
FIG. 1 is a diagrammatic view of an imaging process coupled to a distributed computing network.

System Overview:

Referring to FIG. 1, there is shown imaging process 10 that can reside on and can be executed by computer 12, which can be connected to network 14 (e.g., the Internet or a local area network). Examples of computer 12 can include but are not limited to a single server computer, a series of server computers, a single personal computer, a series of personal computers, a mini computer, a mainframe computer, or a computing cloud. The various components of computer 12 can execute one or more operating systems, examples of which can include but are not limited to: Microsoft Windows Server™; Novell Netware™; Redhat Linux™, Unix, or a custom operating system, for example.

The instruction sets and subroutines of imaging process 10, which can be stored on storage device 16 coupled to computer 12, can be executed by one or more processors (not shown) and one or more memory architectures (not shown) included within computer 12. It should be noted that the one or more processors can be configured to process operations various operations simultaneously (e.g. when extracting or splitting of an image occurs as is discussed in further detail hereinbelow). Storage device 16 can include but is not limited to: a hard disk drive; a flash drive, a tape drive; an optical drive; a RAID array; a random access memory (RAM); and a read-only memory (ROM).

Network 14 can be connected to one or more secondary networks (e.g., network 18), examples of which can include but are not limited to: a local area network; a wide area network; or an intranet, for example.

Imaging process 10 can be accessed via client applications 22, 24, 26, 28. Examples of client applications 22, 24, 26, 28 can include but are not limited to a standard web browser, a customized web browser, or a custom application. The instruction sets and subroutines of client applications 22, 24, 26, 28, which can be stored on storage devices 30, 32, 34, 36 (respectively) coupled to client electronic devices 38, 40, 42, 44 (respectively), can be executed by one or more processors (not shown) and one or more memory architectures (not shown) incorporated into client electronic devices 38, 40, 42, 44 (respectively).

Storage devices 30, 32, 34, 36 can include but are not limited to: hard disk drives; flash drives, tape drives; optical drives; RAID arrays; random access memories (RAM); and read-only memories (ROM). Examples of client electronic devices 38, 40, 42, 44 can include, but are not limited to, personal computer 38, laptop computer 40, smart phone 42, notebook computer 44, a server (not shown), a data-enabled, cellular telephone (not shown), and a dedicated network device (not shown).

One or more of client applications 22, 24, 26, 28 can be configured to effectuate some or all of the functionality of imaging process 10. Accordingly, imaging process 10 can be a purely server-side application, a purely client-side application, or a hybrid server-side/client-side application that is cooperatively executed by one or more of client applications 22, 24, 26, 28 and imaging process 10.

Users 46, 48, 50, 52 can access computer 12 and imaging process 10 directly through network 14 or through secondary network 18. Further, computer 12 can be connected to network 14 through secondary network 18, as illustrated with phantom link line 54.

The various client electronic devices can be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 can be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications can use Ethernet protocol and carrier sense multiple access with collision avoidance (i.e., CSMA/CA) for path sharing. The various 802.11x specifications can use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 can each execute an operating system, examples of which can include but are not limited to Apple iOS™, Microsoft Windows™, Android™, Redhat Linux™, or a custom operating system.

Figure 2:
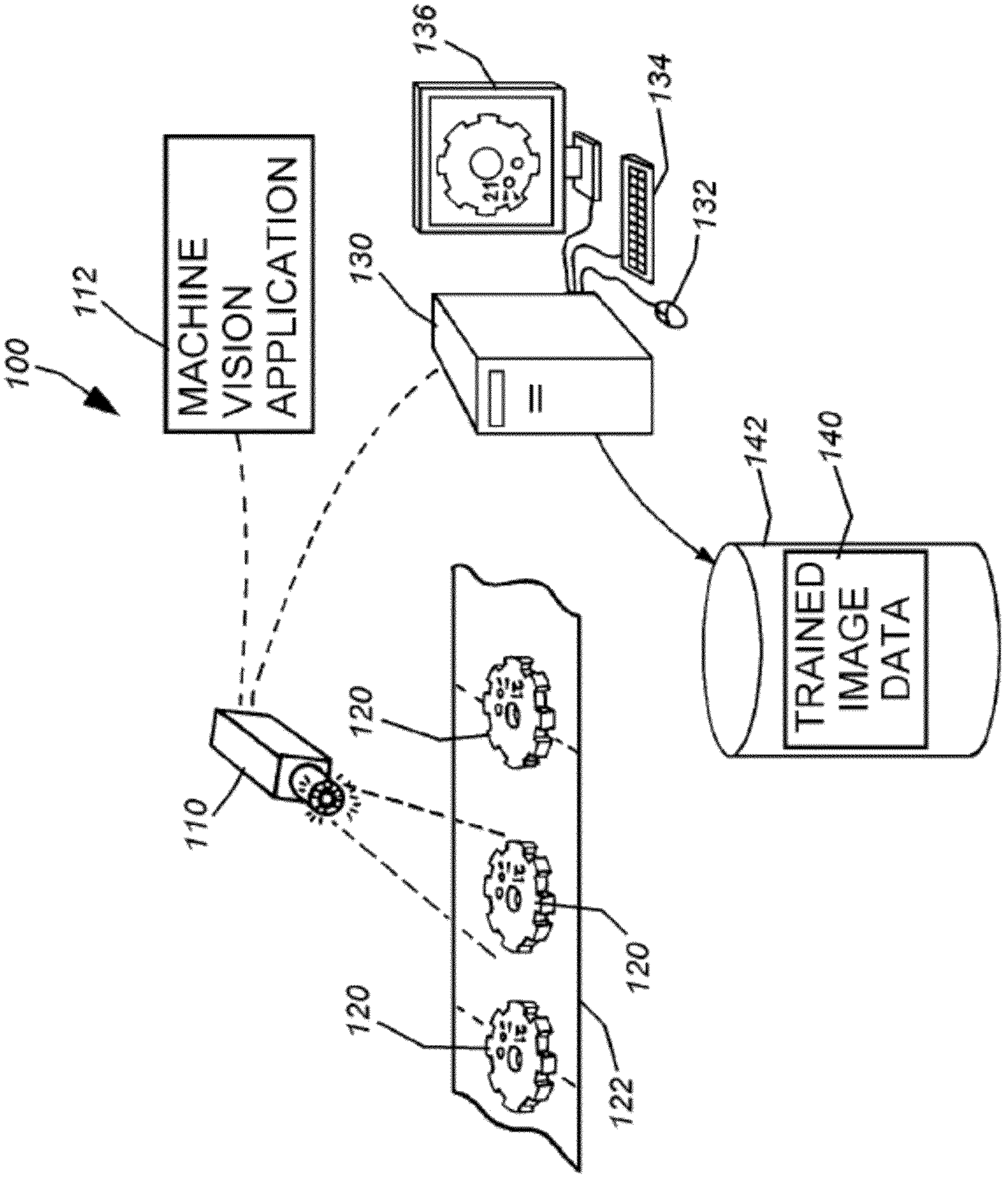
FIG. 2 is a system diagram corresponding to an embodiment of the imaging process of FIG. 1.

Referring now to FIG. 2, an exemplary embodiment depicting a machine vision system 100 configured for use with imaging process 10 is provided. It should be noted that a variety of system implementations can be employed in alternate embodiments without departing from the scope of the present disclosure. As will be described in further detail below, embodiments of imaging process 10 described herein can be generally employed to automatically tune segmentation parameters for one or more characters associated with a given character string. The imaging process described herein can be used at any suitable time during the inspection process. For example, in some embodiments, aspects of the imaging process can occur subsequent to the global positioning/registration of a live or runtime object image relative to a model or training image of the object, and prior to, during, or after inspection of the runtime object or feature.

In some embodiments, machine vision system 100 can include an imaging device 110, which can be a camera that includes an onboard processor (not shown) and a memory (not shown) capable of running a machine vision application 112. Appropriate interfaces, alarms, and signals can be installed in, and/or connected to, camera imaging device 110 so that it is able to respond to a sensed fault detected during the inspection of an underlying object 120. In this embodiment, a conveyor 122 containing a plurality of objects (120) is shown. These objects can pass, in turn, within the predetermined field of view (FOV) of the imaging device 110 during an inspection process. As such, the imaging device 110 can acquire at least one image of each observed object 120.

In some embodiments, conventional microcomputer 130 can be any suitable computing device such as computer 12 shown in FIG. 1. Computer 130 can include graphical user interface components, such as a mouse 132, keyboard 134 and display 136. Other types of interfaces can also be employed, such as a Personal Digital Assistant (PDA) in alternate embodiments. In some embodiments, the imaging device 110 can be connected full-time to the computer 130, particularly where the computer performs the image processing functions. Additionally and/or alternatively, the processor in imaging devices, such as those of the Insight® product line, can allow for independent operation of the device free interconnection with a remote computer. In this embodiment, computer 130 can be connected to, and/or communicates with, the imaging device 110 for device-setup, testing, and analysis of runtime operation.

In some embodiments, data related to a model or training image 140 can be stored in connection with the computer 130 in disc storage 142, and can be stored in the onboard memory of the imaging device 110. This data can include data associated with imaging process 10, which can be employed according to one or more embodiments of the present disclosure.

Figure 3:
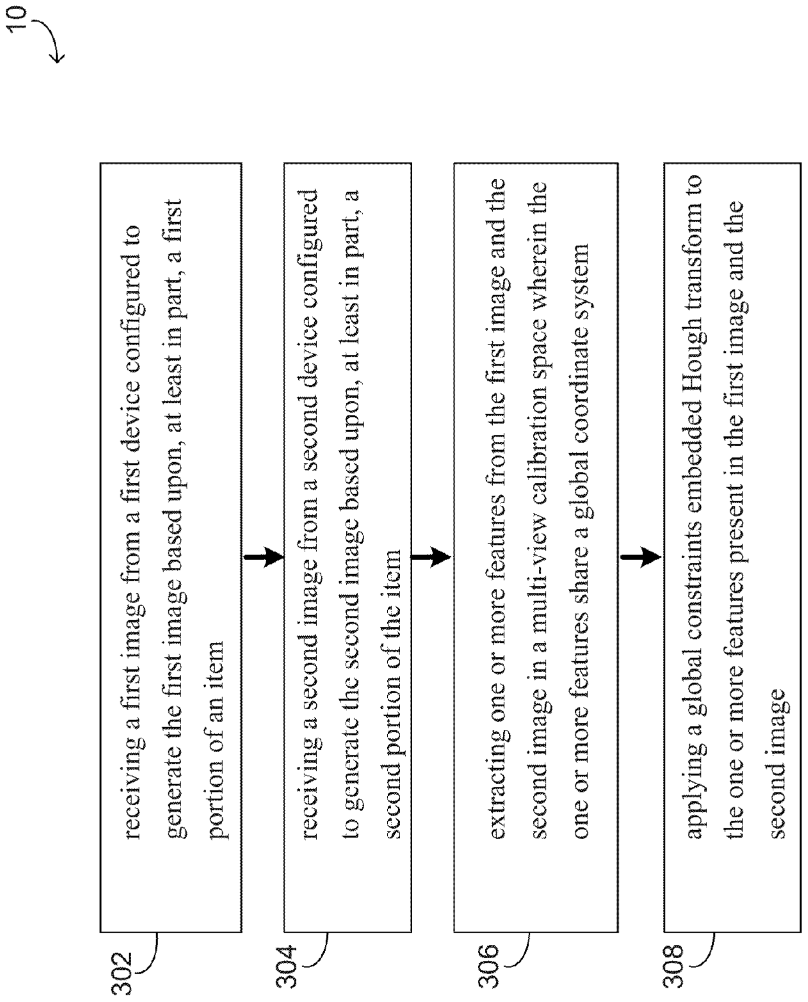
FIG. 3 is a flowchart depicting an embodiment of the imaging process of FIG. 1.

Referring also to FIG. 3, and as will be discussed below in greater detail, imaging process 10 can include receiving (302) a first image from a first device configured to generate the first image based upon, at least in part, a first portion of an item. The method may further include receiving (304) a second image from a second device configured to generate the second image based upon, at least in part, a second portion of the item. The method may also include extracting (306) one or more features from the first image and the second image in a multi-view calibration space wherein the one or more features share a global coordinate system. The method may further include applying (308) a global constraints embedded Hough transform to the one or more features present in the first image and the second image.

Embodiments disclosed herein are directed towards multi-view alignment applications. In such an application, each view may contribute to the alignment by using a sub-model, or a portion of the global model. The correctness of the alignment may be highly dependent on the correct finding of each and every sub-model. However, the sub-model itself (e.g. its shape) may not be sufficiently distinctive to ensure a reliable finding from the individual view. For example, distractive objects having a similar look to the sub-model may be present in an individual view, which may result in a traditional vision tool having difficulty locating the correct sub-model from the view.

Embodiments of the imaging process 10 disclosed herein include an algorithm that takes into account global constraints (which may not available in any individual view alone), and may also increase the probability of correctly locating sub-models in all views. In some embodiments, the one or more global constraints of imaging process 10 can include one or more spatial relationships of sub-models, including but not limited to, their distances, angles, collinearity, parallelism, and perpendicularity.

Figure 4:
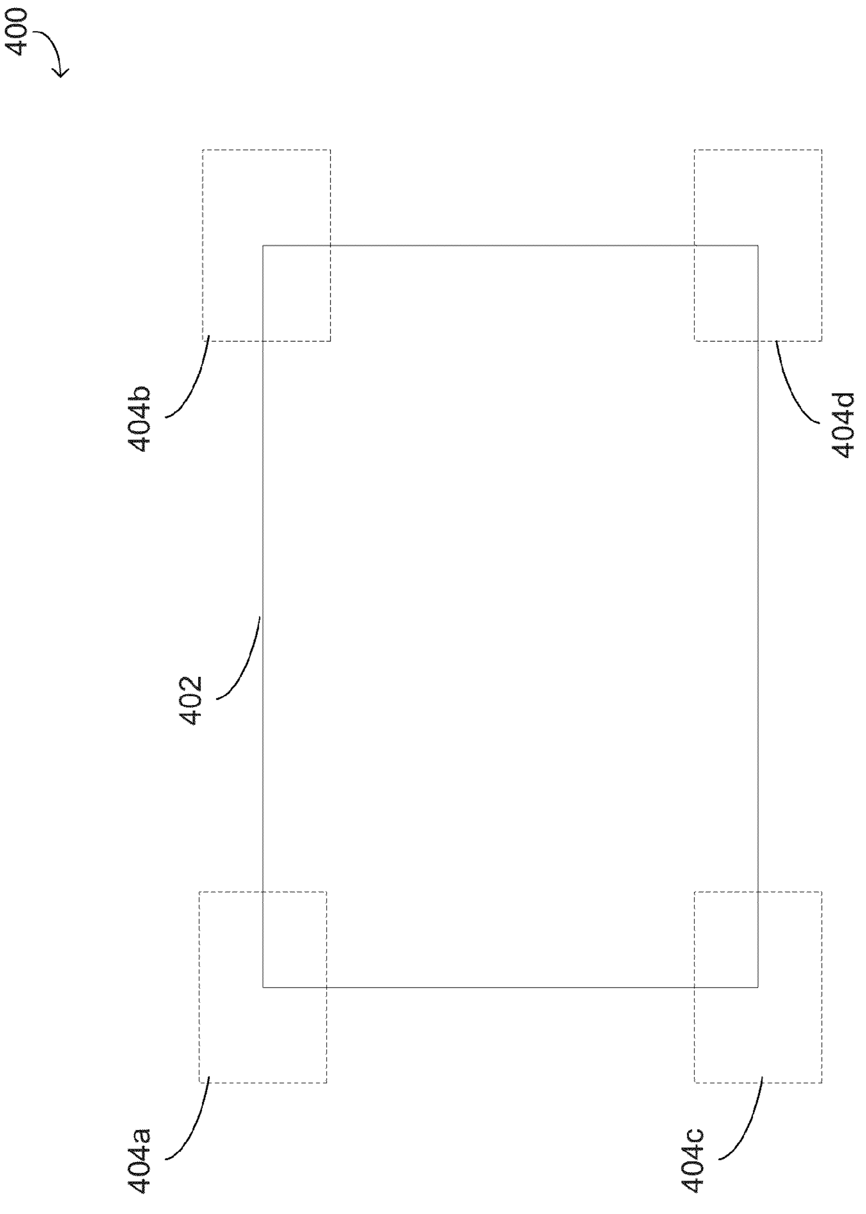
FIG. 4 is a diagram depicting an embodiment of the imaging process of FIG. 1.

Referring now to FIG. 4, an embodiment 400 depicting aspects of imaging process 10 as applied to the alignment of a coverlens associated with a cellphone is provided. It should be noted that the example shown in FIG. 4 is provided merely by way of example as the teachings of the present disclosure may be applied to numerous different applications (e.g., cell phone coverlenses, solar panels, and/or any other suitable application that may require line alignment between one or more objects or devices).

Accordingly, in this particular example, a rectangular coverlens 402 is shown which may require alignment with other objects, such as a cellphone housing, during the manufacturing process. One or more imaging devices (e.g. imaging device 110) may be associated with imaging process 10, each of which may be configured to generate images based upon a particular portion of an item. For example, and as shown in FIG. 4, images of portions 404 a-d of rectangular coverlens 402 may be taken by one or more cameras. These images may be stored for subsequent use by imaging process 10 using any of the computing devices described herein. It should be noted that any number of imaging devices can be used to generate any number of images corresponding to any number of portions without departing from the scope of the present disclosure.

In some embodiments, in a multi-view application, each view may look at a portion of the coverlens edge, for which an image feature (e.g., line segment, curved line, corner, etc.) or a set of image features constitutes a sub-model. Some features may include, but are not limited to, length, contrast, straightness, etc. Without using global constraints, a traditional single-view based vision tool may be unable to reliably locate the sub-model from an individual view, when there are other linear structures present in the view.

Accordingly, embodiments of the present disclosure may utilize global geometric constraints to identify the sub-models from the individual views. In this way, imaging process 10 may be highly resistant to distracting objects that may be located in each view. Imaging process 10 may also be useful in a variety of different situations such as where global constraints cannot be easily transformed into a single-view alignment problem (e.g. when the multiple views are extremely distantly placed).

Figure 5:
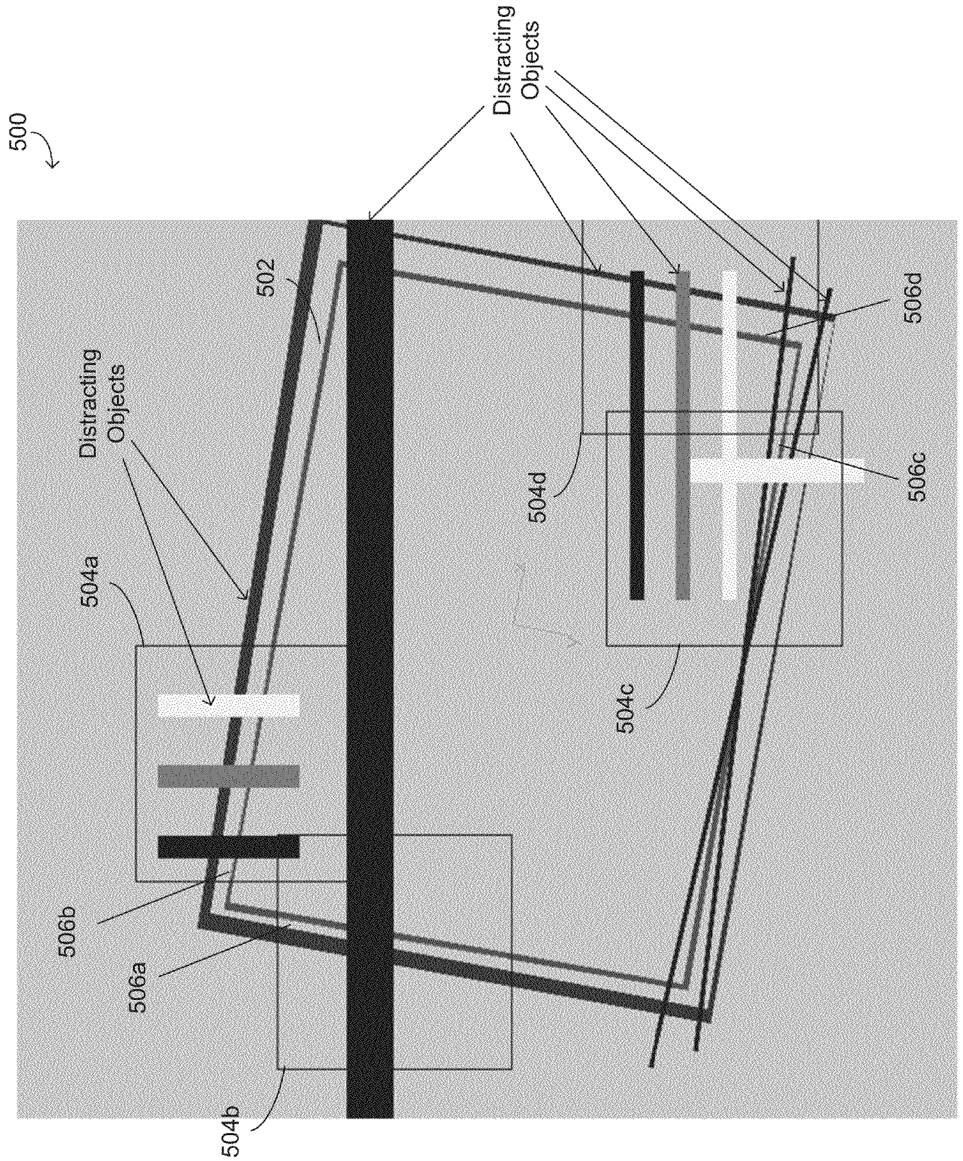
FIG. 5 is a diagram depicting another embodiment of the imaging process of FIG. 1

Referring now to FIG. 5, another embodiment 500 of imaging process 10 is shown as applied to a cell phone coverlens alignment problem. In this particular example, rectangular cellphone coverlens 502 is shown. Images of various portions of the item may be taken and/or received via one or more imaging devices. For example, each image may correspond to a particular portion of the item, e.g., portions of rectangular coverlens 502 shown in views 504*a-d*. Correctly identified submodels 506*a-d* are also shown in FIG. 5. Accordingly, in some embodiments, imaging process 10 may receive one or more inputs. Some inputs may include, but are not limited to, a geometric model, a set of calibrated images, and a set of constraints such as the size tolerance of the model. Imaging process 10 may report a pose of the model, or a set of poses, as well as a set of features that match with the model.

In some embodiments, one or more features, which can include both the sub-model and the distracting objects, can be extracted from individual images. Some possible examples of distracting objects are shown in FIG. 5. In accordance with imaging process 10, features can be represented using line segments of any suitable length. Imaging process 10 can use any suitable line extraction methodology without departing from the scope of the present disclosure. Some features detectors can include, but are not limited to, edge-detection, PatMax®, Blob Analysis, and Caliper functionality, associated with products available from the assignee of the present disclosure.

In some embodiments, imaging process 10 may be configured to extract one or more features from the first image and the second image in a multi-view calibration space wherein the one or more features share a global coordinate system. Imaging process 10 can be configured to apply the global constraints within the multi-view calibration space. The concept of a multi-view calibration space is discussed in U.S. Pat. Nos. [5,960,125, 5,978,521, 6,137,893, and 5,825,483] available from the assignee of the present disclosure, which are each incorporated by reference herein in their entirety. In some embodiments, one or more features present in the plurality of images can share a global coordinate system associated with the multi-view calibration space.

In some embodiments, imaging process 10 may be configured to apply a Hough transform to the one or more features present in the received images in order to determine appropriate pose candidates. More specifically, in some embodiments imaging process 10 may utilize a global constraints embedded Hough transform. In the example shown in FIGS. 4-5, when a line feature votes for pose bins, the range of the bins receiving the votes reflects the coverlens size constraint, in this way, the tighter the size tolerance is, the fewer the bins can receive a vote. More information on the Hough transform can be found in the following article "Generalizing the Hough transform to detect arbitrary shapes", D. Ballard, Pattern Recognition, vol. 13, 1981, pp. 111-122. Although the examples of transforms described herein use a Hough example, other transforms may be used without departing from the scope of the subject application.

In some embodiments, the Hough parameter space is the pose space. The Hough-style transform can be specialized using various techniques. For example, each feature's voting can be controlled by the constraints its view bears and the range of the voting can be determined by the input constraints (e.g. coverlens size, etc.). It should be noted that translation and rotation can be voted and/or weighed separately and in some embodiments, translation can be performed first. In some embodiments, the one or more features can be used to generate a quantized score for use in applying the Hough transform.

In some embodiments, for each pose candidate, a set of supporting features can be identified by applying the input constraints. The final pose results can be calculated using their supporting features and are scored using the total strengths of the support features. A set of poses, as well as their corresponding sets of features, is returned. As shown in FIGS. 4-5, imaging process 10 can be made applicable to settings where there are two or more views, each looking at a portion of the target object. Aspects of imaging process 10 can be specialized to training and runtime procedures. It should be noted that the teachings of the present disclosure can be applied to sub-models of any shapes, including but not limited to, straight lines, curved lines, corners, etc.

Embodiments of the imaging process described herein can be used to apply global constraints to multiple view alignment problems in order to address a variety of different problems (e.g. coverlens, solar panel alignments, and/or any other suitable situation requiring line alignment). Accordingly, embodiments described herein can be used to produce a more accurate and reliable alignment for various items such as those encountered during manufacturing processes, etc.

Embodiment of imaging process 10 does not require stitching of any views. Alternatively, all of the views are calibrated as discussed in U.S. Pat. Nos. [5,960,125, 5,978,521, 6,137,893, and 5,825,483], such that all pixels or features in all views share a common global coordinate system. Extracted image features (e.g., lines) can be represented using their global coordinates, and therefore features from different views can be operated together.

As will be appreciated by one skilled in the art, the present disclosure can be embodied as a method, system, or computer program product. Accordingly, the present disclosure can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, the present disclosure can take the form of a computer program product on a computer-usable storage medium having computer-usable program code embodied in the medium.

Any suitable computer usable or computer readable medium can be utilized. The computer-usable or computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code can be transmitted using any appropriate medium, including but not limited to the Internet, wireline, optical fiber cable, RF, etc.

Computer program code for carrying out operations of the present disclosure can be written in an object oriented programming language such as Java, Smalltalk, C++ or the like.

However, the computer program code for carrying out operations of the present disclosure can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:

receiving a first image from an imaging device configured to generate the first image based upon, at least in part, a first portion of an item;

receiving a second image from the imaging device configured to generate the second image based upon, at least in part, a second portion of the item;

extracting one or more features from the first image and the second image in a multi-view calibration space wherein the one or more features share a global coordinate system; and applying a global constraints embedded Hough transform to the one or more features present in the first image and the second image;

wherein the one or more features are used, at least in part, to generate a quantized score for use in applying the global constraints embedded Hough transform.

2. The computer-implemented method of claim 1, wherein the imaging device includes a plurality of imaging devices.

3. The computer-implemented method of claim 1, further comprising:

applying one or more global constraints to the Hough transform in the multi-view calibration space.

4. The computer-implemented method of claim 3, wherein the one or more global constraints include one or more spatial relationships of sub-models.

5. The computer-implemented method of claim 1, wherein the one or more features include at least one of length, contrast, and straightness of a particular line segment.

6. The computer-implemented method of claim 4, wherein the one or more global constraints include distance, angle, collinearity, parallelism, and perpendicularity.

7. A computer program product residing on a non-transitory computer readable storage medium having a plurality of instructions stored thereon, which when executed by a processor, cause the processor to perform operations comprising:

receiving a first image from a first device configured to generate the first image based upon, at least in part, a first portion of an item;

receiving a second image from a second device configured to generate the second image based upon, at least in part, a second portion of the item;

extracting one or more features from the first image and the second image in a multi-view calibration space wherein the one or more features share a global coordinate system; and applying a global constraints embedded Hough transform to the one or more features present in the first image and the second image;

wherein the one or more features are used, at least in part, to generate a quantized score for use in applying the global constraints embedded Hough transform.

8. The computer program product of claim 7, wherein the imaging device includes a plurality of imaging devices.

9. The computer program product of claim 7, further comprising:

applying one or more global constraints to the Hough transform in the multi-view calibration space.

10. The computer program product of claim 9, wherein the one or more global constraints include one or more spatial relationships of sub-models.

11. The computer program product of claim 7, wherein the one or more features include at least one of length, contrast, and straightness of a particular line segment.

12. The computer program product of claim 10, wherein the one or more global constraints include distance, angle, collinearity, parallelism, and perpendicularity.

13. An imaging system comprising:

one or more processors configured to receive a first image from a first device configured to generate the first image based upon, at least in part, a first portion of an item, the one or more processors further configured to receive a second image from a second device configured to generate the second image based upon, at least in part, a second portion of the item, the one or more processors further configured to extract one or more features from the first image and the second image in a multi-view calibration space wherein the one or more features share a global coordinate system, the one or more processors further configured to apply a global constraints embedded Hough transform to the one or more features present in the first image and the second image, wherein the one or more features are used, at least in part, to generate a quantized score for use in applying the global constraints embedded Hough transform.

14. The imaging system of claim 13, wherein the imaging device includes a plurality of imaging devices.

15. The imaging system of claim 13, further comprising:

applying one or more global constraints to the Hough transform in the multi-view calibration space.

16. The imaging system of claim 15, wherein the one or more global constraints include one or more spatial relationships of sub-models.

17. The imaging system of claim 16, wherein the one or more global constraints include distance, angle, collinearity, parallelism, and perpendicularity.

18. A computer-implemented method comprising:

receiving a first image from an imaging device configured to generate the first image based upon, at least in part, a first portion of an item;

receiving a second image from the imaging device configured to generate the second image based upon, at least in part, a second portion of the item;

extracting one or more features from the first image and the second image in a multi-view calibration space wherein the one or more features share a global coordinate system; and applying a global constraints embedded transform to the one or more features present in the first image and the second image;

wherein the one or more features are used, at least in part, to generate a quantized score for use in applying the global constraints embedded transform.

* * * * *